United States Patent
Yu et al.

(10) Patent No.: US 8,234,061 B2
(45) Date of Patent: Jul. 31, 2012

(54) SYSTEMS AND METHODS FOR CONTROLLING A SATELLITE NAVIGATION RECEIVER

(75) Inventors: Xiaoguang Yu, Wuhan (CN);
Hongzhang Wang, Wuhan (CN)

(73) Assignee: O2Micro, Inc, Santa Clara, CA (US)

(*) Notice: Subject to any disclaimer, the term of this patent is extended or adjusted under 35 U.S.C. 154(b) by 463 days.

(21) Appl. No.: 12/568,950

(22) Filed: Sep. 29, 2009

(65) Prior Publication Data
US 2010/0100320 A1  Apr. 22, 2010

Related U.S. Application Data

(63) Continuation-in-part of application No. 12/545,994, filed on Aug. 24, 2009.

(60) Provisional application No. 61/196,825, filed on Oct. 21, 2008.

(51) Int. Cl.
*G01C 21/00* (2006.01)
(52) U.S. Cl. .................................................. 701/213
(58) Field of Classification Search .................... 701/213
See application file for complete search history.

(56) References Cited

U.S. PATENT DOCUMENTS

| | | | |
|---|---|---|---|
| 5,592,173 A | 1/1997 | Lau et al. | |
| 6,133,871 A | 10/2000 | Krasner | |
| 6,222,484 B1 | 4/2001 | Seiple et al. | |
| 7,375,682 B1 | 5/2008 | Tester et al. | |
| 7,500,125 B2 | 3/2009 | Yasumoto | |
| 2002/0004708 A1 | 1/2002 | Farine et al. | |
| 2005/0083230 A1 | 4/2005 | Harvey et al. | |
| 2005/0275587 A1 | 12/2005 | Siegel et al. | |
| 2007/0276583 A1 | 11/2007 | Dobeck et al. | |
| 2008/0150797 A1* | 6/2008 | Jia et al. | 342/357.06 |
| 2009/0167603 A1* | 7/2009 | Muraguchi | 342/357.12 |

OTHER PUBLICATIONS

EP extended Search Report dated Jun. 23, 2010 for corresponding EP application 09168597.4.
EP extended Search Report dated Jun. 30, 2010 for corresponding EP application 09173393.1.

* cited by examiner

*Primary Examiner* — Harry Liu

(57) ABSTRACT

A satellite navigation receiver having multiple operation states includes a processing unit and a power management interface. The processing unit is operable for locating the satellite navigation receiver based on multiple satellite signals and operable for setting multiple time durations of the operation states respectively based on a velocity of the satellite navigation receiver. The power management interface coupled to the processing unit is operable for switching the satellite navigation receiver among the operation states according to the time durations.

21 Claims, 13 Drawing Sheets

SYSTEMS AND METHODS FOR CONTROLLING A SATELLITE NAVIGATION RECEIVER

RELATED APPLICATION

This application is a continuation-in-part of the co-pending U.S. application Ser. No. 12/545,994, titled "System and Methods for Controlling a Satellite Navigation Receiver", filed on Aug. 24, 2009, which is hereby incorporated by reference in its entirety. This application also claims priority to U.S. Provisional Application No. 61/196,825, titled "Satellite Navigation System Receivers with Different Working Modes", filed on Oct. 21, 2008, which is hereby incorporated by reference in its entirety.

BACKGROUND

A satellite navigation system, e.g., a global positioning system (GPS), allows satellite navigation receivers, e.g., GPS receivers, to determine their locations and velocities according to satellite signals. The GPS may include a constellation of more than 24 GPS satellites orbiting the earth. There can be at least four GPS satellites visible at a given time and a given place on the earth surface. Each GPS satellite continuously broadcasts GPS signals at a predetermined frequency. The GPS signals contain time and orbital information of the satellites. A GPS receiver can receive the GPS signals transmitted from at least four GPS satellites synchronously. Based on the time and orbital information of at least four GPS satellites, geographical coordinates of the GPS receiver including latitude, longitude, and altitude can be calculated.

Nowadays, vehicles and electronic devices such as personal digital assistants (PDAs) and cellular phones can be equipped with GPS receivers. The GPS receiver can include multiple acquisition channels and tracking channels, and can work in a boost state or in a normal state. In the boost state, all the acquisition channels and tracking channels are enabled to acquire and track the GPS satellites. If more than four satellites are tracked, the GPS receiver can be switched to the normal state. In the normal state, only one or two channels may be enabled. If some GPS signals of the tracked GPS satellites are lost, the GPS receiver can be switched back to the boost state. However, the conventional GPS receiver has relatively high power consumption.

SUMMARY

In one embodiment, a satellite navigation receiver having multiple operation states includes a processing unit and a power management interface. The processing unit is operable for locating the satellite navigation receiver based on multiple satellite signals and operable for setting multiple time durations of the operation states respectively based on a velocity of the satellite navigation receiver. The power management interface coupled to the processing unit is operable for switching the satellite navigation receiver among the operation states according to the time durations.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Figure 1A:
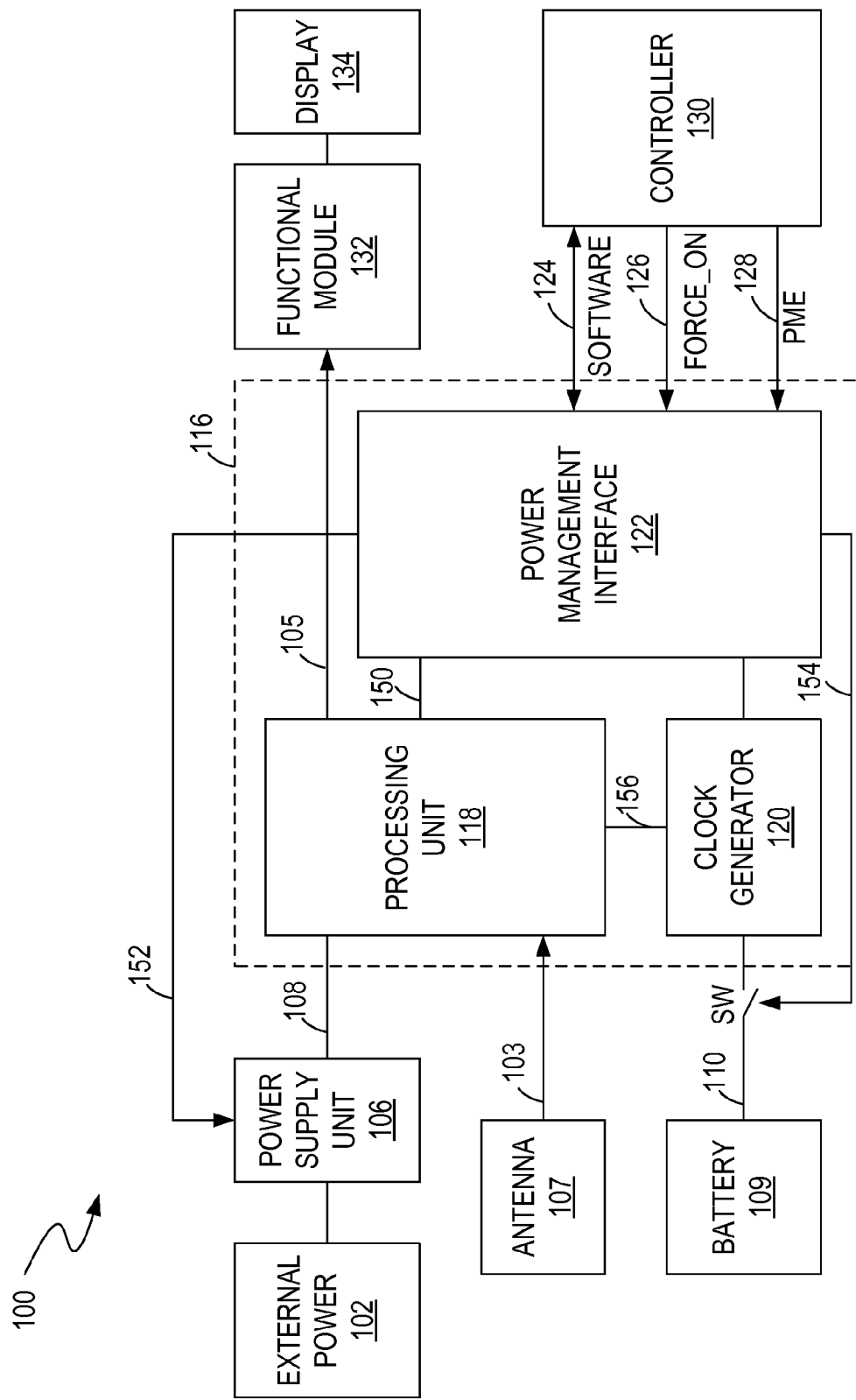
FIG. 1A illustrates a block diagram of a GPS device, in accordance with one embodiment of the present invention.

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "locating," "switching," "setting," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments in accordance with the present disclosure provide a satellite navigation receiver that can calculate its geographical location and velocity based on satellite signals. The satellite navigation receiver, e.g., a global positioning system (GPS) receiver, includes a processing unit and a power management interface. Advantageously, the satellite navigation receiver can operate in multiple operation states. For example, the satellite navigation receiver can be switched between a working state and a sleep state. The power consumption of the satellite navigation receiver can be reduced if the satellite navigation receiver is switched to the sleep state. Moreover, the processing unit includes a navigation module operable for adjusting time durations of the working state and the sleep state according to the velocity of the satellite navigation receiver. Thus, the processing unit updates the geographic location more frequently if satellite navigation receiver moves faster. As such, the accuracy of the positioning of the satellite navigation receiver can be improved. The invention is described under the context of GPS receivers for illustrative purposes. However, the invention is not so limited and can be implemented in other types of satellite navigation receivers.

FIG. 1A illustrates a block diagram of a GPS device 100, in accordance with one embodiment of the present invention. In the example of FIG. 1A, the GPS device 100 includes an antenna 107, a GPS receiver 116, and a functional module 132. The antenna 107 is capable of receiving GPS signals 103 transmitted from multiple GPS satellites and providing the GPS signals 103 to the GPS receiver 116.

In one embodiment, the GPS receiver 116 includes a processing unit 118 and a clock generator 120. The processing unit 118 is operable for processing the GPS signals 103, and for locating the GPS device 100 accordingly. The processing unit 118 analyzes acquisition and tracking data obtained from the GPS signals 103 to determine location information such as geographical coordinates and velocity of the GPS device 100. The clock generator 120 coupled to the processing unit 118 can be, but is not limited to, a real-time clock unit. The clock generator 120 is operable for providing a reference clock 156 to the processing unit 118. The reference clock 156 can be used by the processing unit 118 to measure a traveling time of the GPS signals 103 from a corresponding satellite to the GPS receiver 116.

Figure 1B:
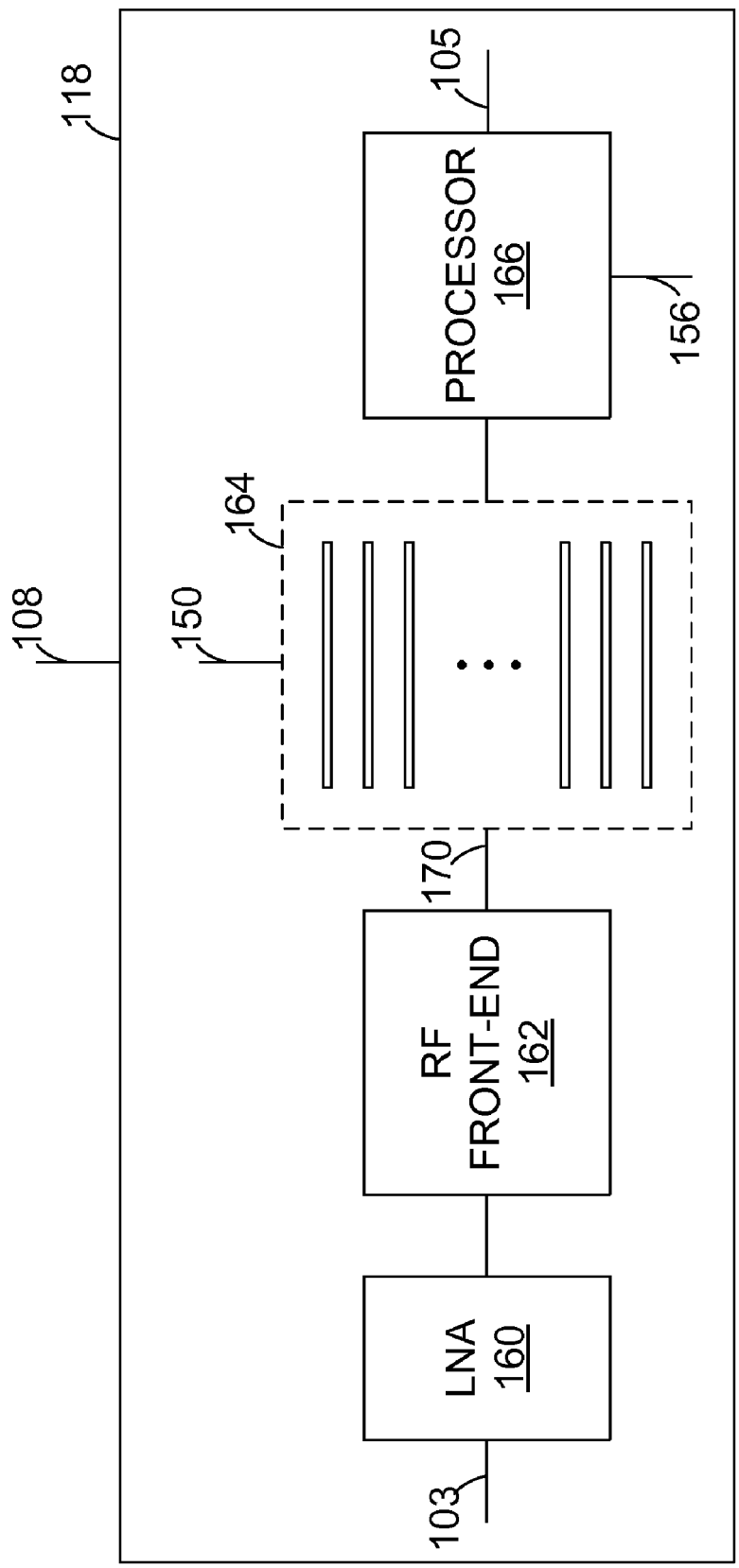
FIG. 1B illustrates an example of a processing unit of FIG. 1A, in accordance with one embodiment of the present invention.

FIG. 1B illustrates an example of the processing unit 118, in accordance with one embodiment of the present invention. Elements labeled the same as in FIG. 1A have similar functions. FIG. 1B is described in combination with FIG. 1A.

In the example of FIG. 1B, the processing unit 118 includes a low-noise amplifier (LNA) 160, a radio frequency (RF) front-end 162, multiple channels 164, and a processor 166. The low-noise amplifier 160 is operable for filtering and amplifying the GPS signals 103. The RF front-end 162 is operable for converting the analog GPS signals 103 to digital GPS satellite data 170.

The channels 164 can receive the GPS satellite data 170 and can acquire and track the GPS satellites by analyzing the GPS satellite data 170. In one embodiment, the multiple channels 164 include acquisition (ACQ) channels and tracking (TRK) channels. The channels 164 can be classified into multiple channel groups. Each channel group can include an acquisition channel and a tracking channel, and can be assigned to process data for a corresponding GPS satellite. More specifically, the acquisition channel can acquire the corresponding satellite according to the GPS satellite data 170. For example, the acquisition channel may be used to analyze the GPS satellite data 170 and determine if the corresponding satellite is within view of (visible to) the GPS receiver 116. If the satellite is acquired by the acquisition channel, a corresponding tracking channel can be used to track the satellite. If the satellite is tracked, the tracking channel provides the acquisition and tracking data to the processor 166. As such, different GPS satellites may be acquired and tracked by different groups of the acquisition channel and the tracking channel respectively.

The processor 166 can be a central processing unit (CPU), a microprocessor, a digital signal processor, or any other such device that can read and execute programming instructions. In one embodiment, the processor 166 can execute machine-executable instructions stored in a machine-readable medium and configure the acquisition channels and tracking channels based on the analysis of the acquisition and tracking data.

In one embodiment, the processor 166 can employ the reference clock 156 to extract a ranging code (e.g., a Coarse/Acquisition code) and navigation data from the acquisition and tracking data. The ranging code includes a pseudorandom noise code (PN or PRN code) that identifies a corresponding satellite. Each satellite has a unique pseudorandom noise code. Pseudoranges between the tracked GPS satellites and the GPS device 100 can be obtained from the ranging code. The navigation data can contain GPS date and time, ephemeris data indicating a position of a corresponding satellite, and almanac data indicating information and status concerning all the satellites. Geographical coordinates of the tracked GPS satellites can be obtained from the navigation data. As such, based on the obtained pseudoranges and the geographical coordinates associated with at least four GPS satellites, the processor 166 can calculate the geographical coordinates of the GPS device 100.

In one embodiment, the processor 166 is further capable of generating a coordinate signal 105 indicative of the geographic coordinates of the GPS device 100 according to a result of the calculation. The processing unit 118 can have other components, and is not limited to the example of FIG. 1B.

Referring to FIG. 1A, the functional module 132 can employ the coordinate signal 105 to perform multiple GPS related functions. In one embodiment, the GPS device 100 further includes a display 134 such as a liquid crystal display (LCD) screen. The display 134 coupled to the functional module 132 is operable for displaying the location of the GPS device 100 based on the coordinate signal 105. For example, the functional module 132 can perform a displaying function which shows the geographical coordinates of the GPS device 100 on the display 134 according to the coordinate signal 105. The functional module 132 can also perform a map function, which highlights the position of the GPS device 100 on a map shown on the display 134 according to the coordinate signal 105.

The processing unit 118 is powered by system power 108. In one embodiment, the GPS device 100 includes a power supply unit 106 operable for receiving power from an external power source 102, and for providing the system power 108 to the GPS receiver 116 accordingly. More specifically, in one embodiment, the external power source 102 can be an alternative current (AC) to direct current (DC) adapter for providing direct current (DC) power. The power supply unit 106 can be a low drop-out linear voltage regulator (LDO), which can convert the DC power to the system power 108 having a voltage level suitable for powering the processing unit 118.

The clock generator 120 is powered by battery power 110. In one embodiment, the GPS device 100 further includes a battery 109 operable for providing the battery power 110. Separately powered, the clock generator 120 and the processing unit 118 can operate separately. In one embodiment, the clock generator 120 can be powered by the battery power 110 to measure time of an operation state of the GPS receiver 116, e.g., a sleep state of the GPS receiver 116 in which the system power 108 to the processing unit 118 is cut off.

In one embodiment, the GPS receiver 116 further includes a power management interface 122 coupled to the processing unit 118 and the clock generator 120. The power management interface 122 is operable for generating multiple switch signals to control the power and channels of the GPS receiver 116. More specifically, the power management interface 122 can generate a power-switch signal 152 to control the system power 108. The power supply unit 106 can receive the power-switch signal 152 and can control the system power 108 accordingly. Moreover, the power management interface 122 can generate a battery-switch signal 154 to control the battery power 110. In one embodiment, the battery 109 is coupled to the clock generator 120 via a switch SW. Thus, the battery power 110 can be switched on/off by the switch SW based on the battery-switch signal 154. Additionally, the power management interface 122 can generate a channel-switch signal 150 to control the channels 164. In one embodiment, the processing unit 118 provides one or more system clocks to the channels 164. The processing unit 118 can enable/disable a channel by switching on/off a corresponding system clock according to the channel-switch signal 150.

In one embodiment, the GPS device 100 further includes a controller 130 coupled to the GPS receiver 116 and operable for providing multiple control signals, e.g., software control commands 124 and hardware control signals (e.g., a FORCE_ON signal 126 and a PME signal 128), according to the system needs or user demands. In one embodiment, the controller 130 can be included in the GPS receiver 116, and is not limited to the example of FIG. 1A.

In one embodiment, the control signals, e.g., the software control commands 124, are generated by a navigation software application installed in a machine-readable medium of the controller 130. The navigation software application can include a user interface (UI) for interacting with the user, and can include machine-executable instruction codes for generating the software control commands 124 according to the user demands or the system needs. In one embodiment, the power management interface 122 is coupled to the controller 130 via a universal bus, e.g., a serial universal asynchronous receiver/transmitter (UART) bus. The universal bus can transfer the software control commands 124 generated by the navigation software application to the GPS receiver 116.

In one embodiment, the control signals, e.g., the software control commands or the hardware control signals, can also be generated in response to a hardware action. In one embodiment, the controller 130 can monitor statuses of one or more buttons, e.g., on the GPS device 100, and can generate the control signals according to the statuses. For example, if a FORCE_ON button, e.g., on the GPS device, is pressed, e.g., by the user, the controller 130 can generate an active/inactive FORCE_ON signal 126 to switch on/off the system power 108. Moreover, if a shut-down button, e.g., on the GPS device 100, is pressed, the navigation software application of the controller 130 can generate a shut-down control command.

Furthermore, in one embodiment, the controller 130 can monitor a status of the display 134 and can generate the hardware control signals accordingly. For example, if the display 134 is turned off, e.g., by the user, the controller 130 can generate an inactive power management event (PME) signal 128. The power management interface 122 can disable the channels 164 of the processing unit 118 according to the inactive PME signal 128. If the display 134 is turned on, the controller 130 can generate an active PME signal 128. The power management interface 122 can enable the channels 164 of the processing unit 118 according to the active PME signal 128.

In one embodiment, the power management interface 122 can switch the GPS receiver 116 in multiple operation states by generating the switch signals, e.g., the power-switch signal 152, the battery-switch signal 154, and the channel-switch signal 150. The operation states can include, but are not limited to, one or more working states, a sleep state, and a shut-down state.

More specifically, in one embodiment, the GPS receiver 116 enters the working states if both of the processing unit 118 and the clock generator 120 are powered on. Thus, the GPS receiver 116 continuously works in the working states.

The GPS receiver 116 enters the sleep state if the processing unit 118 is powered off and the clock generator 120 is powered on. Thus, the processing unit 118 stops working accordingly. The clock generator 120 continues to generate the reference clock 156 which can be used to measure a time period of the sleep state. The GPS receiver 116 enters the shut-down state if both of the processing unit 118 and the clock generator 120 are powered off. Thus, the processing unit 118 and the clock generator 120 stop working and do not consume power in the shut-down state.

In one embodiment, the working states of the GPS receiver 116 include, but is not limited to, a boost state, a normal state, and an idle state. In the working states such as the boost state, the normal state, and the idle state, the processing unit 118 and the clock generator 120 are both powered on based on the power-switch signal 152 and the battery-switch signal 154. Moreover, the channels 164 can be controlled according to the channel-switch signal 150. For example, the processing unit 118 enables or disables one or more system clocks for the channels 164 according to the channel-switch signal 150.

In the boost state, all the channels 164 including the acquisition channels and the tracking channels are enabled. In the normal state, a predetermined number of the channels 164 are disabled and other channels remain enabled. In the idle state, all of the channels 164 are disabled. Other components of the processing unit 118 can continue operating. For example, in the idle state, the processing unit 118 disables all of the system clocks for the channels 164. Although the processing unit 118 is powered on, all of the channels 164 stop working in the idle state. The processing unit 118 stops tracking the GPS satellites, but can generate the coordinate signal 105 in the idle state. Since all the channels 164 are disabled in the idle state, the power consumption of the GPS device 100 can be reduced.

To switch the GPS receiver 116 among different operation states, the power management interface 122 can receive the control signals, e.g., software control commands and hardware control signals, from the controller 130, and can generate the switch signals, e.g., the power-switch signal 152, the battery-switch signal 154, and the channel-switch signal 150, accordingly. Alternatively, the power management interface 122 can automatically switch the GPS receiver 116 among different operation states according to the system needs. For example, the power management interface 122 can monitor statuses of the channels 164, and can automatically switch the GPS receiver 116 among the boost state, the normal state, and the idle state according to the statuses, which will be detailed described in relation to FIG. 4. The power management interface 122 can also employ the reference clock 156 to measure time of an operation state, e.g., the sleep state. If a predetermined time period for the operation state expires, the power management interface 122 can automatically switch the GPS receiver 116 to another state, e.g., the boost state. In this circumstance, the power management interface 122 can operate without being controlled by the controller 130.

In one embodiment, the GPS device 100 can operate in a plurality of operation modes such as a continuously positioning mode, an interval positioning mode, and a required positioning mode. The controller 130 can select different operation modes to enable the GPS receiver 116 to operate in different operation states, e.g., the boost state, the normal state, the idle state, and the sleep state, which will be detailed described in FIG. 2-FIG. 6.

Advantageously, the GPS receiver 116 can operate in different operation states according to the user demands or system needs. Thus, the efficiency of the GPS device 100 can be improved. Moreover, the power consumption of the GPS device 100 can be reduced when the GPS receiver 116 operates in the idle state, the sleep state, or the shut-down state.

Figure 2:
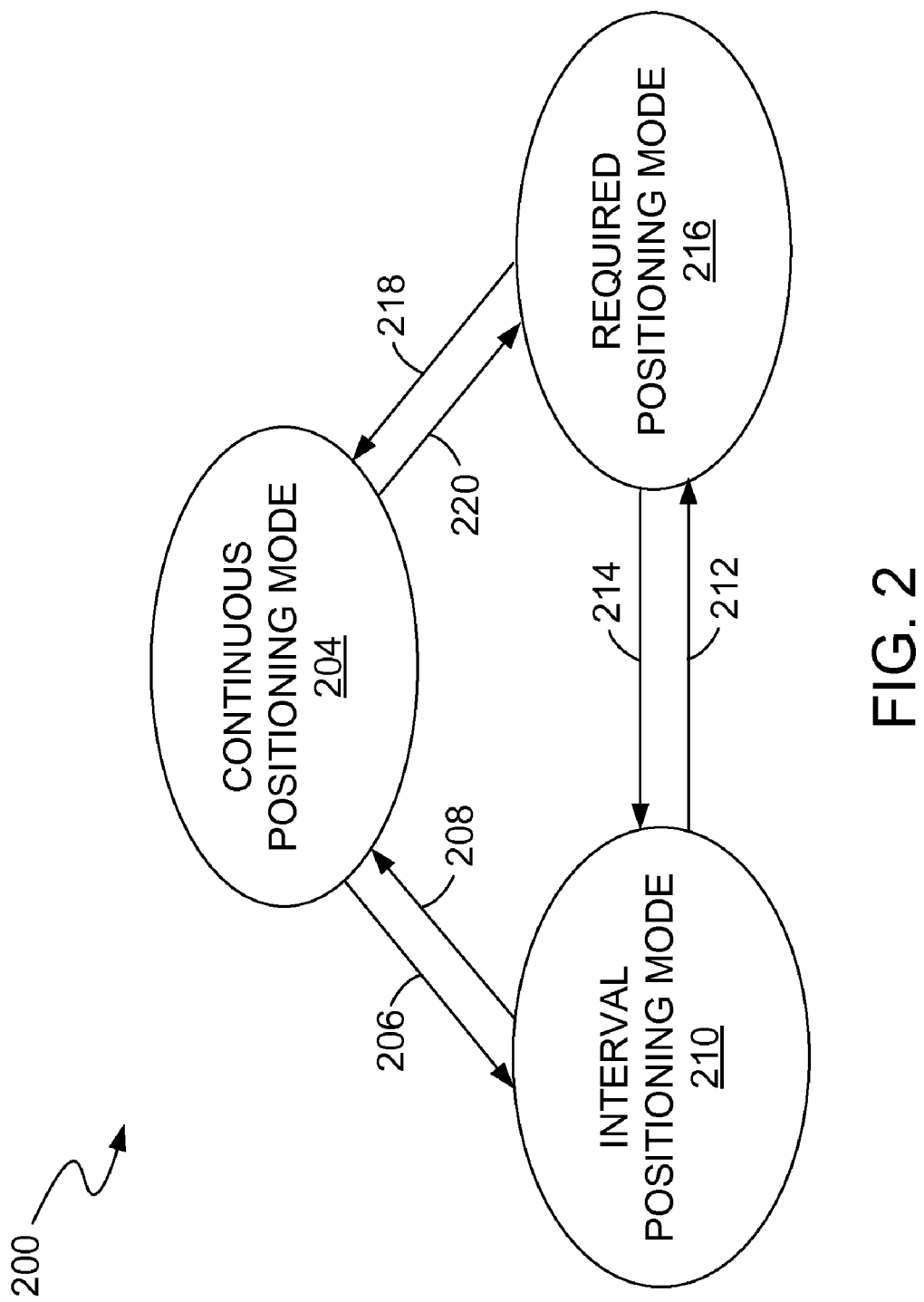
FIG. 2 illustrates an example of operation modes of a GPS device, in accordance with one embodiment of the present invention.

FIG. 2 illustrates an example of operation modes of the GPS device 100, in accordance with one embodiment of the present invention. FIG. 2 is described in combination with FIG. 1A. The operation modes of the GPS device 100 can include a continuous positioning mode 204, an interval positioning mode 210, and a required positioning mode 216. In one embodiment, the flowchart in FIG. 2 can be implemented as machine-executable instructions stored in a machine-readable medium.

In the continuous positioning mode 204, the GPS receiver 116 is enabled to operate in the working states (e.g., the boost state, the normal state, or the idle state) without entering the sleep state. Thus, the processing unit 118 keeps operating, e.g., calculating the geographic coordinates of the GPS device 100, in the continuous positioning mode 204.

In the interval positioning mode 210, the GPS receiver 116 is enabled to alternately operate in the working states for a first predetermined time period T1, and operate in the sleep state for a second predetermined time period T2. For example, the navigation software application of the controller 130 can prompt the user to set an operation time and a sleep time. The GPS receiver 116 can operate in the working states for the time period T1 according to the operation time, and can be suspended in the sleep state for the time period T2 according to the sleep time.

In the required positioning mode 216, the GPS receiver 116 operates in the working states for a predetermined time period T3, and operates in the sleep state until the power management interface 122 receives a signal from the controller 130 to activate the GPS receiver 116. For example, the navigation software application of the controller 130 can prompt the user to set an operation time. The GPS receiver 116 can operate in the working states for the time period T3 according to the operation time. After T3 is expired, the GPS receiver 116 can enter the sleep state. The power management interface 122 can generate an inactive power-switch signal 152 to cut off the system power 108 in the sleep state. If the GPS receiver 116 is required to operate, e.g., if the FORCE_ON button is pressed, the controller 130 can generate a control signal, e.g., the FORCE_ON signal, to activate the GPS receiver 116. Upon receiving the FORCE_ON signal, the power management interface 122 can generate an active power-switch signal 152 to recover the system power 108 accordingly.

In one embodiment, the controller 130 selects the continuous positioning mode 204 by default. For example, if the GPS device 100 is powered on or is cold booted, the GPS device 100 can enter the continuous positioning mode 204 by default. In another example, the GPS device 100 can be automatically switched to the continuous positioning mode 204 if the battery 109 for the clock generator 120 is replaced with a new battery.

In one embodiment, the controller 130 can select an operation mode, e.g., according to a user command. By way of example, if the GPS device 100 is in a relatively fast movement and/or in an unfamiliar environment, and/or if the GPS signals are relatively weak or unstable, the controller 130 can switch the GPS device 100 to the continuous positioning mode 204. If the GPS device 100 does not need to track the GPS signals continuously, e.g., in a relatively simple surrounding topography, the GPS device 100 can be enabled to work in the interval positioning mode 210 or the required positioning mode 216.

As such, the operation modes of the GPS device 100 can be switched according to the control signals from the controller 130. For example, in transition 206, the GPS device 100 can be switched from the continuous positioning mode 204 to the interval positioning mode 210 according to the software control commands 124 from the navigation software application of the controller 130. Similarly, in transition 208, the GPS device 100 can be switched back to the continuous positioning mode 204 according to software control commands 124 or an active FORCE_ON signal 126 from the controller 130. Other transitions such as transitions 218, 220, 212 and 214 can be enabled in a similar way.

Figure 3:
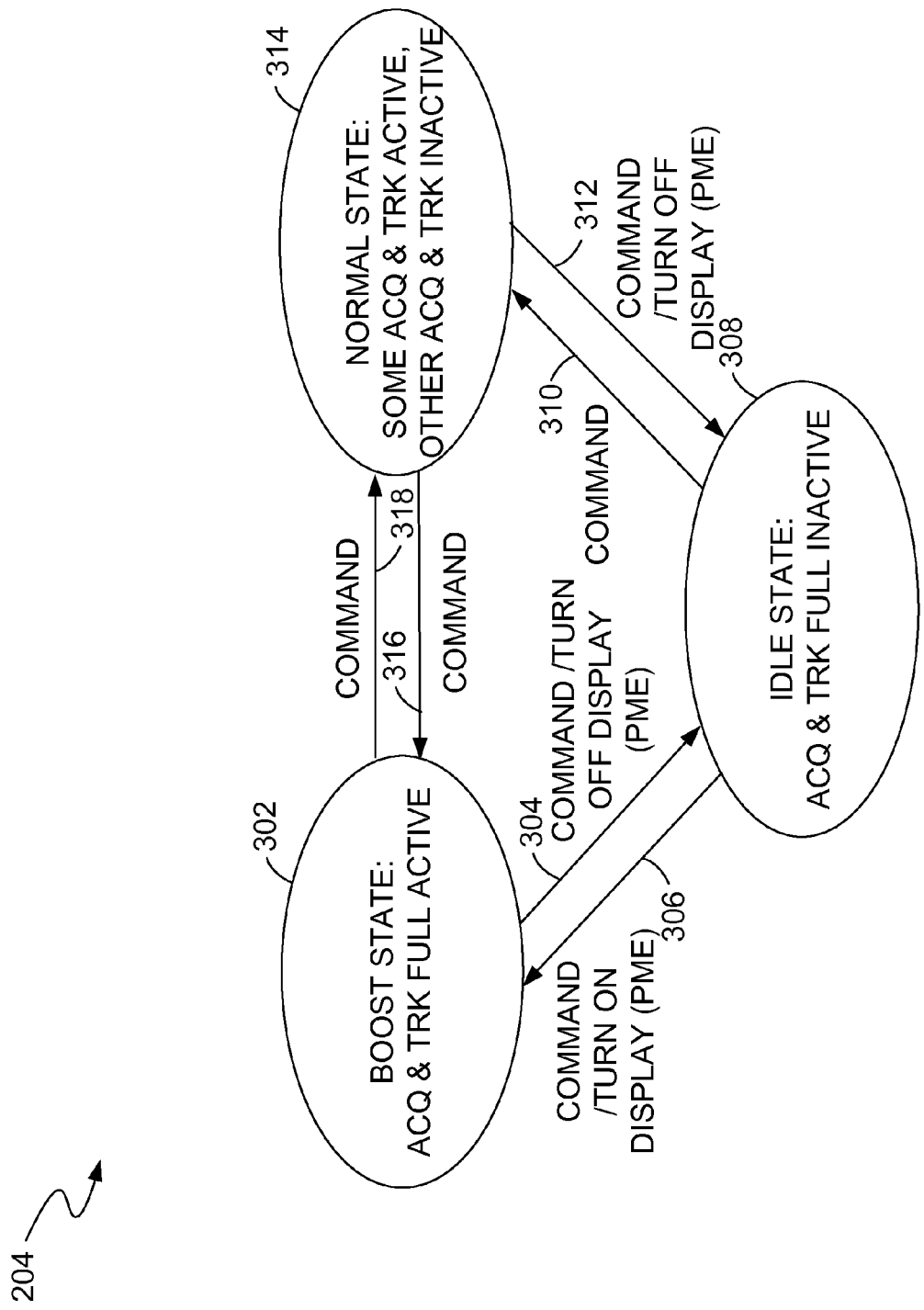
FIG. 3 illustrates an example of operation states of a GPS receiver in a continuous positioning mode, in accordance with one embodiment of the present invention.

FIG. 3 illustrates an example of operation states of the GPS receiver 116 in the continuous positioning mode 204 of FIG. 2, in accordance with one embodiment of the present invention. FIG. 3 is described in combination with FIG. 1A, FIG. 1B and FIG. 2. In one embodiment, the flowchart in FIG. 3 can be implemented as machine-executable instructions stored in a machine-readable medium.

In the continuous positioning mode 204, the GPS receiver 116 is enabled to operate in one or more working states without entering the sleep state. The working states of the GPS receiver 116 can include an idle state 308, a normal state 314, and a boost state 302. In the example of FIG. 3, the power management interface 122 can switch the operation states of the GPS receiver 116 among the idle state 308, the normal state 314, and the boost state 302 according to the control signals from the controller 130.

If the controller 130 enables the continuous positioning mode 204, the GPS receiver 116 can enter the boost state 302 by default. In addition, if the display 134 is turned on or the controller 130 receives a command (e.g., from the user) to switch the GPS receiver 116 to the boost state 302, the controller 130 can generate a control signal to trigger a transition 306 or 316. For example, the controller 130 can generate an active PME signal 128. Accordingly, the power management interface 122 can generate the channel-switch signal 150 to enable all the channels 164. For example, the GPS device 100 may provide 12 acquisition channels and 14 tracking channels. In the boost state 302, all the 12 acquisition channels and 14 tracking channels are enabled. Thus, the GPS receiver 116 enters the boost state 302.

If the controller 130 receives a command (e.g., from the user) to switch the operation state to the normal state 314, the controller 130 can generate a control signal to trigger a state transition 310 or 318. By way of example, if at least a predetermined number of GPS satellites, e.g., four or more GPS satellites, are tracked in the boost state 302, the controller 130 can generate a control signal to trigger the transition 318, e.g., according to a user command. The power management interface 122 can generate the channel-switch signal 150 to enable some of channels 164. For example, four tracking channels are enabled to track the GPS satellites and the other tracking channels and all the acquisition channels are disabled. Thus, the GPS receiver 116 enters the normal state 314.

If the display 134 of the GPS device 100 is turned off or the controller 130 receives a command (e.g., from the user) to switch the GPS receiver 116 to the idle state 308, the controller 130 can generate a control signal, e.g., an inactive PME signal 128, to trigger a transition 304 or 312. Upon receiving the inactive PME signal 128, the power management interface 122 can generate the channel-switch signal 150 to disable all the channels. Thus, the GPS receiver 116 enters the idle state 308.

Figure 4:
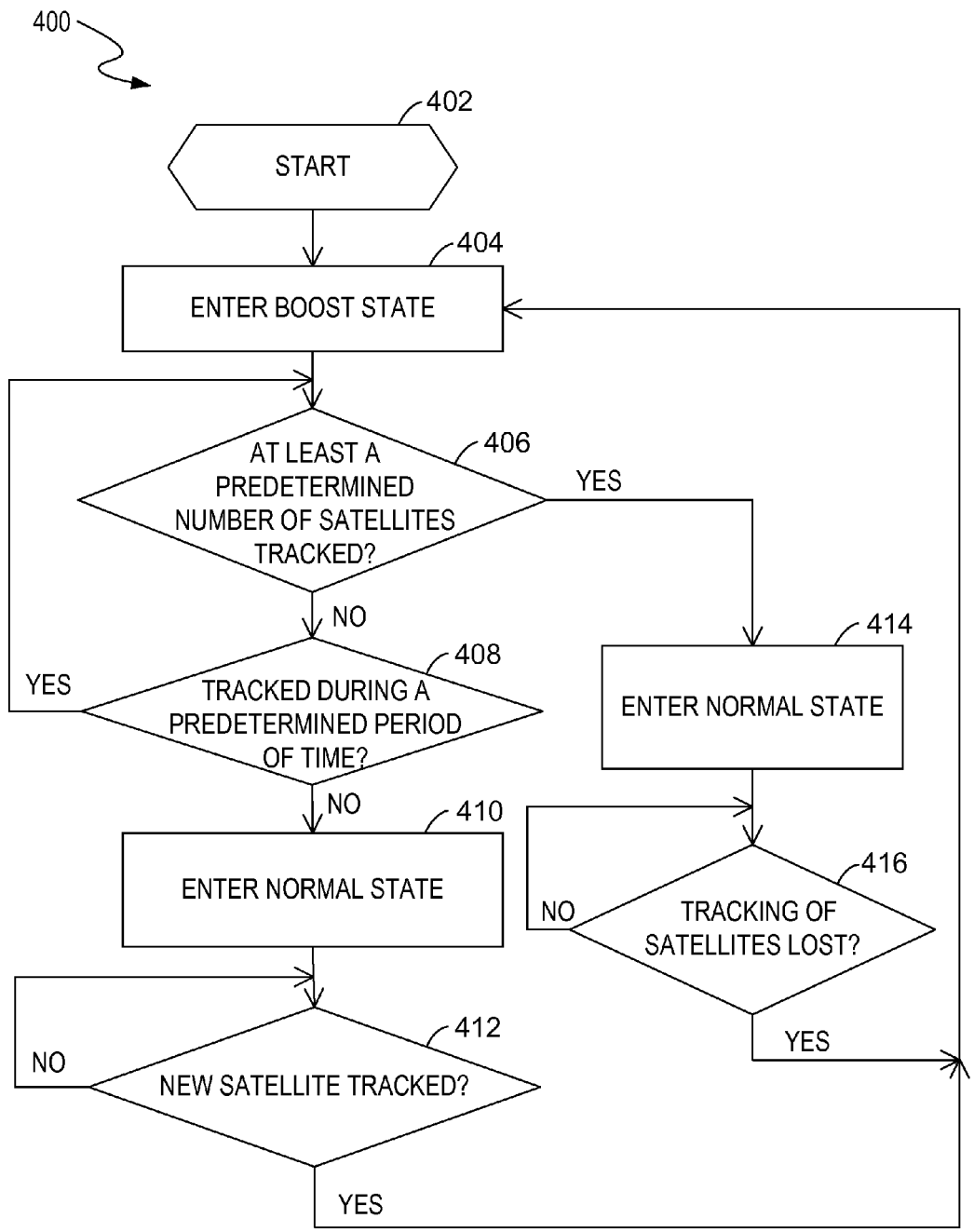
FIG. 4 illustrates a flowchart of an operation process performed by a GPS receiver in a continuous positioning mode, in accordance with one embodiment of the present invention.

FIG. 4 illustrates a flowchart 400 of an operation process performed by the GPS receiver 116 in the continuous positioning mode 204, in accordance with one embodiment of the present invention. FIG. 4 is described in combination with FIG. 1A, FIG. 1B and FIG. 2. In one embodiment, the flowchart 400 in FIG. 4 can be implemented as machine-executable instructions stored in a machine-readable medium.

The power management interface 122 can automatically switch the GPS receiver 116 among different operation states according to the system needs. In the example of FIG. 4, the power management interface 122 monitors the channels 164, and switches the GPS receiver 116 among the idle state 308, the normal state 314, and the boost state 302 according to the statuses of the channels 164.

At step 402, the controller 130 selects the continuous positioning mode 204. At step 404, the GPS receiver 116 enters the boost state 302 by default.

At step 406, the power management interface 122 monitors the channels 164. If at least a predetermined number of GPS satellites are tracked, e.g., four or more GPS satellites are tracked, the power management interface 122 can automatically switch the GPS receiver 116 to the normal state 314 at step 414. In the normal state 314, the tracking channels that track the satellites are in operation. Other channels, e.g., the acquisition channels and other inactive tracking channels, can be disabled at step 414. As such, the GPS receiver 116 does not acquire GPS signals but keeps tracking the visible GPS satellites, in one embodiment.

At step 416, if the GPS receiver 116 loses the tracking of the GPS satellites, the power management interface 122 can automatically switch the GPS receiver 116 back to the boost state 302 at step 404. Otherwise, the GPS receiver 116 stays in the normal state 314.

At step 406, if less than the predetermined number of GPS satellites are tracked, the GPS receiver 116 can continue to acquire GPS signals from the GPS satellites for a predetermined time period T4 at step 408. If at least the predetermined number of GPS satellites are tracked during the predetermined time period T4 at step 408, the flowchart 400 goes back to the step 406. Steps following the step 406 have been described and will not be repetitively described herein. If at least the predetermined number of GPS satellites still can not be tracked after T4 expires, the power management interface 122 automatically switches the GPS receiver 116 to the normal state 314 at step 410. In the normal state 314, a predetermined number of the channels are enabled and other channels are disabled. For example, one acquisition channel is enabled to acquire the satellites and other acquisition channels are disabled. Additionally, the tracking channels that track the satellites are in operation. Other inactive tracking channels can be disabled at step 410.

At step 412, the power management interface 122 monitors the channels 164. If a new satellite is tracked, the GPS receiver 116 can be switched to the boost state 302 at step 404. Otherwise, the GPS receiver 116 stays in the normal state 314 until a new satellite is tracked. The GPS receiver 116 operating in the continuous positioning mode 204 can have other states and/or state transitions, and is not limited to the example of FIG. 3 and FIG. 4.

Figure 5:
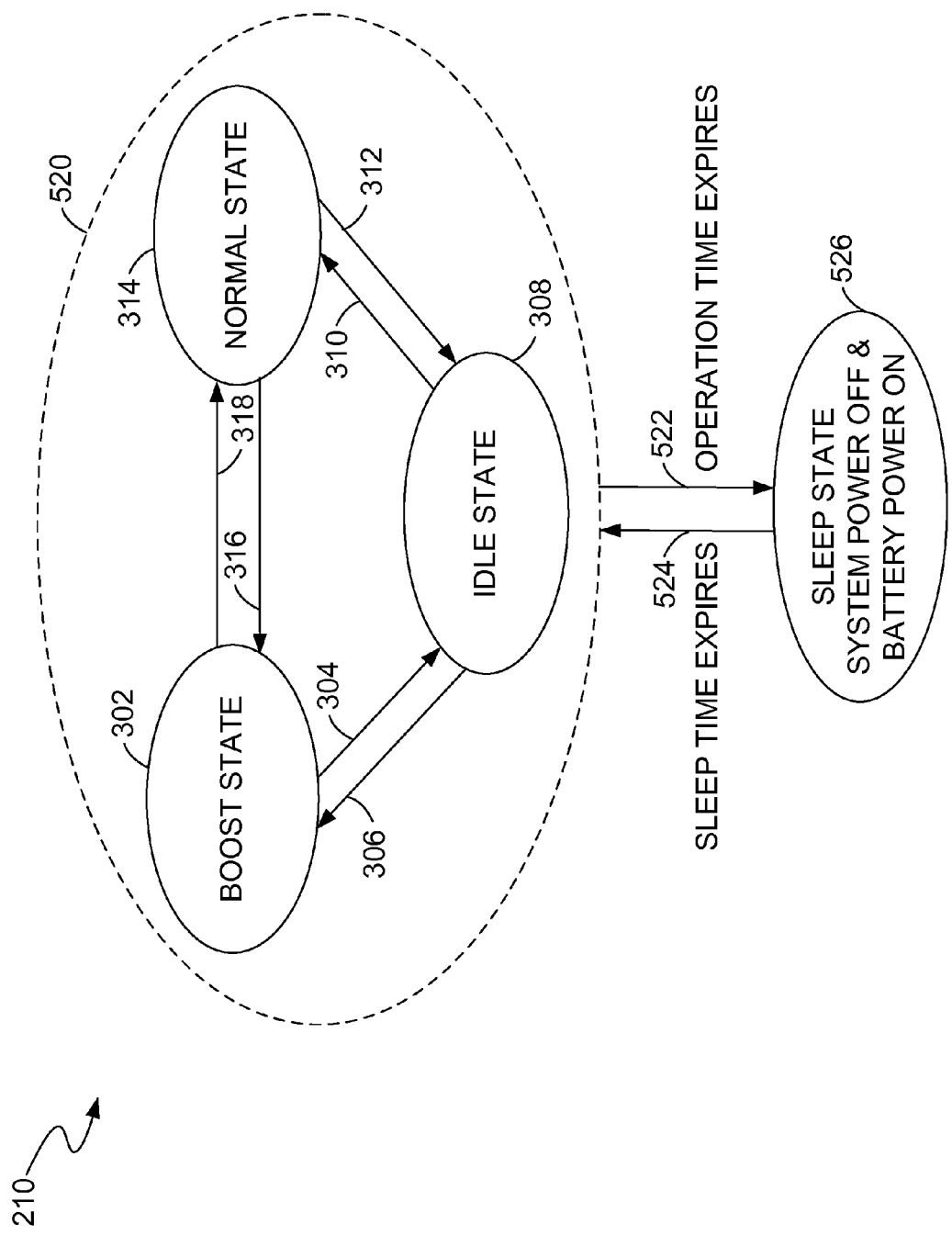
FIG. 5 illustrates an example of operation states of a GPS receiver in an interval positioning mode, in accordance with one embodiment of the present invention.

FIG. 5 illustrates an example of operation states of the GPS receiver 116 in the interval positioning mode 210 of FIG. 2, in accordance with one embodiment of the present invention. Elements labeled the same as in FIG. 3 have similar functions. FIG. 5 is described in combination with FIG. 1A and FIG. 3. In one embodiment, the flowchart in FIG. 5 can be implemented as machine-executable instructions stored in a machine-readable medium.

In the example of FIG. 5, the GPS receiver 116 in the interval positioning mode 210 can operate in one or more working states 520 and a sleep state 526. The controller 130 selects the interval positioning mode 210, e.g., according to a user command. The navigation software application of the controller 130 can prompt the user to set an operation time and a sleep time. The power management interface 122 can alternately enable the GPS receiver 116 to operate in the working states 520 for a first predetermined time period T1 according to the operation time, and operate in the sleep state 526 for a second predetermined time period T2 according to the sleep time.

By way of example, when the controller 130 selects the interval positioning mode 210, the GPS receiver 116 can first enter the working states 520 by default. The GPS receiver 116 operates in a similar way as described in relation to FIG. 3 or FIG. 4. The clock generator 120 can be used to time the working period of the working states 520. If the operation time expires, e.g., after the GPS receiver 116 operates in the working states 520 for the first predetermined time period T1, the power management interface 122 can automatically switch the GPS receiver 116 to the sleep state 526 through the transition 522. Alternatively, the controller 130 can generate control signals to switch the GPS receiver 100 from the working states 520 to the sleep state 526. For example, the controller 130 can generate an inactive FORCE_ON signal if a button on the GPS device 100 is pressed. Thus, the power management interface 122 can generate an inactive power-switch signal 152 to cut off the system power 108. Accordingly, the GPS receiver 116 can be switched to the sleep state 526 through the transition 522.

In the sleep state 526, the battery-switch signal 154 is active. Therefore, the clock generator 120 can also be used to time the sleep time of the sleep state 526. If the sleep time expires, e.g., after the GPS receiver 116 operates in the sleep state 526 for the second predetermined time period T2, the power management interface 122 can automatically switch the GPS receiver 116 to the working states 520 through the transition 524.

Figure 6:
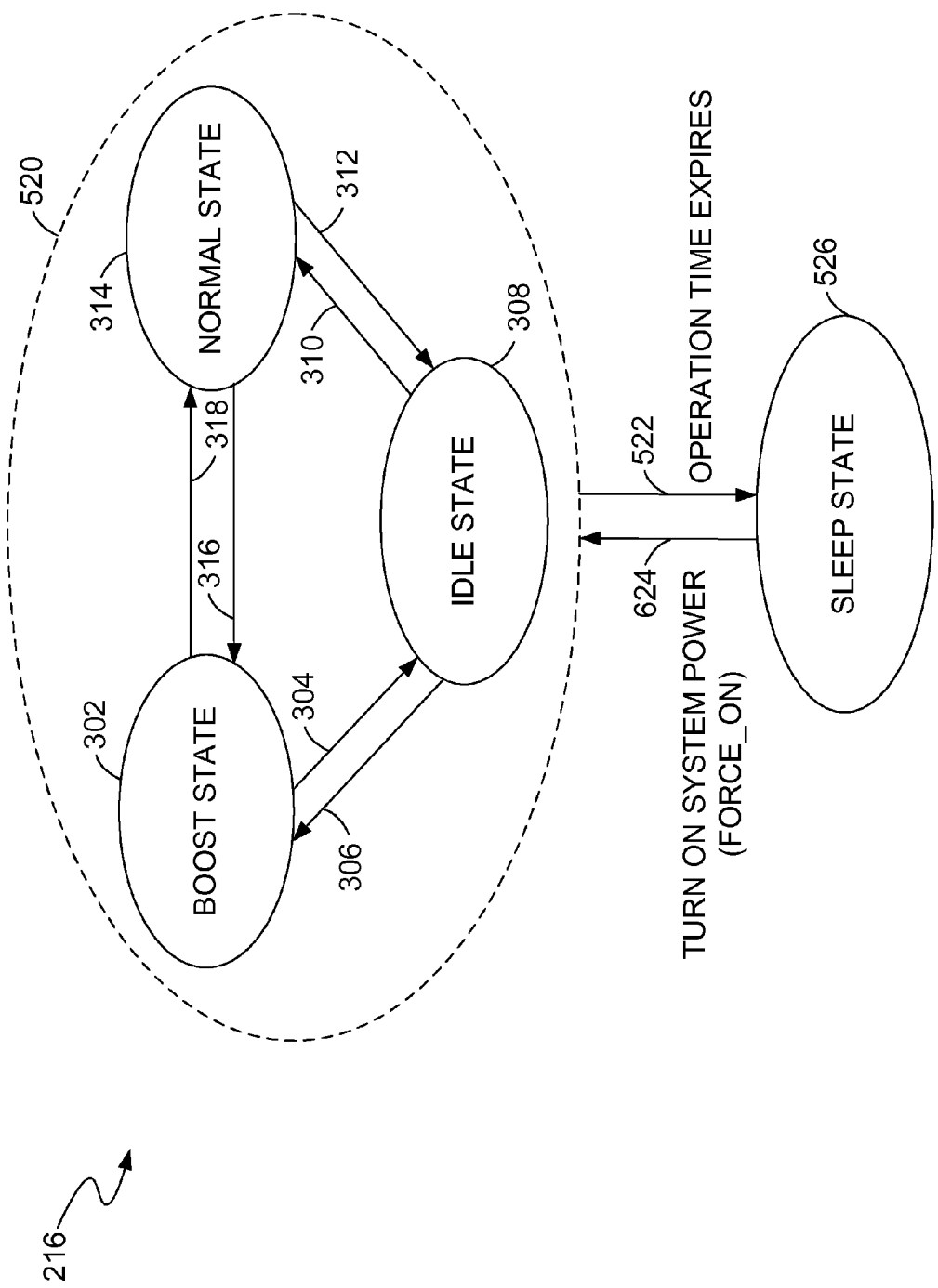
FIG. 6 illustrates an example of operation states of a GPS receiver in a required positioning mode, in accordance with one embodiment of the present invention.

FIG. 6 illustrates an example of operation states of the GPS receiver 116 in the required positioning mode 216 of FIG. 2, in accordance with one embodiment of the present invention. Elements labeled the same as in FIG. 3 and FIG. 5 have similar functions. FIG. 6 is described in combination with FIG. 1A and FIG. 5. In one embodiment, the flowchart in FIG. 6 can be implemented as machine-executable instructions stored in a machine-readable medium.

In the example of FIG. 6, the GPS receiver 116 in the required positioning mode 210 can operate in the working states 520 and the sleep state 526. The navigation software application of the controller 130 can prompt the user to set an operation time. The power management interface 122 enables the GPS receiver 116 to operate in the working states 520 for a predetermined time period T3 according to the operation time, and operate in the sleep state 526 until receiving a control signal from the controller 130 to activate the GPS receiver 116.

Similar to the discussion in relation to FIG. 5, the GPS receiver 116 can enter the working states 520 by default, and can be switched to the sleep state 526 if the transition 522 is triggered. However, in the required positioning mode 216, the GPS receiver 116 is not automatically switched to the working states 520. Rather, the transition 624 is triggered when the power management interface 122 receives a control signal to activate the GPS receiver 116, e.g., the active FORCE_ON signal if the user presses a corresponding button.

Figure 7:
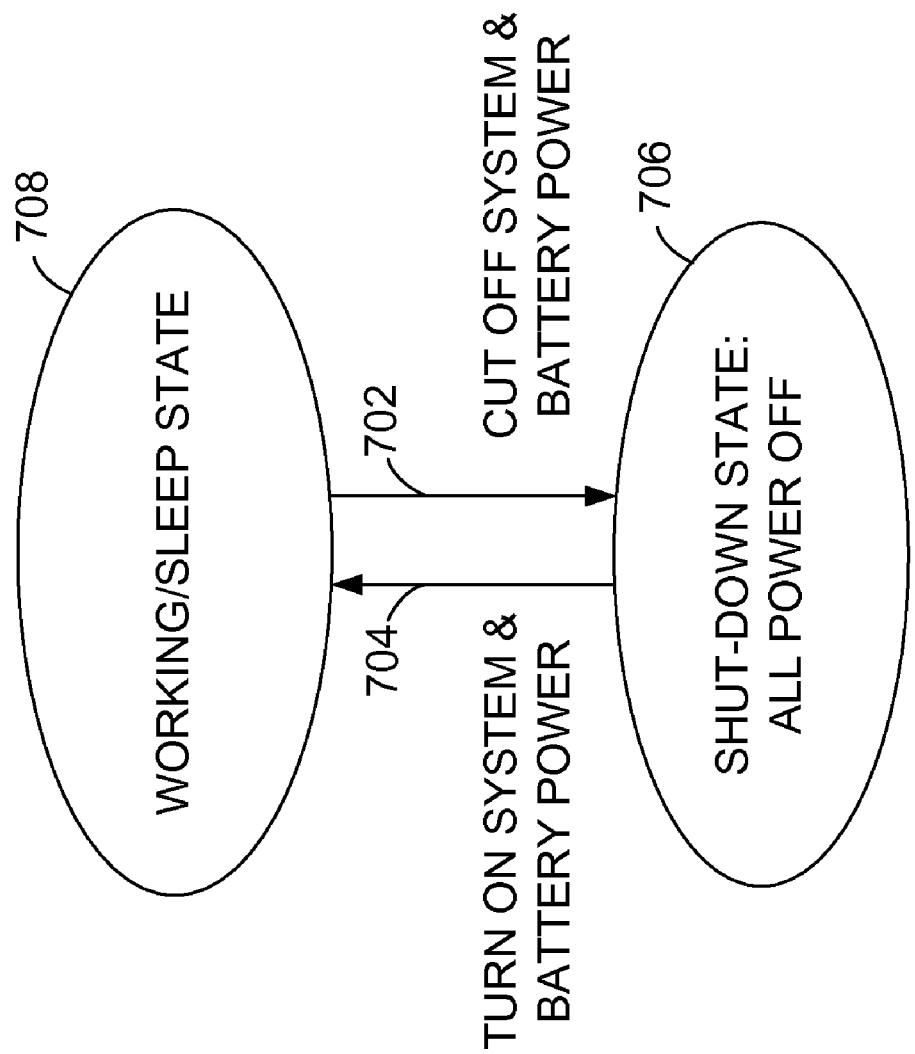
FIG. 7 illustrates another example of operation states of a GPS receiver, in accordance with one embodiment of the present invention.

FIG. 7 illustrates another example of operation states of the GPS receiver 116, in accordance with one embodiment of the present invention. FIG. 7 is described in combination with FIG. 1A and FIG. 2-FIG. 6. In one embodiment, the flowchart in FIG. 7 can be implemented as machine-executable instructions stored in a machine-readable medium.

In one embodiment, the GPS receiver 116 can be switched to a shut-down state 706 regardless which mode/state the GPS receiver 116 operates in. For example, in block 708, the GPS receiver 116 operates in the working states 520 or the sleep state 526. In transition 702, the navigation software application of the controller 130 can generate a shut-down control command, e.g., if a shut-down button on the GPS device 100 is pressed. Thus, the power management interface 122 generates an inactive power-switch signal 152 to cut off the system power 108, and generates an inactive battery-switch signal 154 to cut off the battery power 110 in the shut-down state. In transition 704, the controller 130 switches the GPS receiver 116 back to the working states 520 or the sleep state 526 depending on the recovery of the system power 108 and the battery power 110. In block 708, the power management interface 122 can switch the GPS receiver 116 among different operation states such as the boost state 302, the normal state 314, the idle state 308, and the sleep state 526, as discussed in relation to FIG. 2-FIG. 6.

Figure 8:
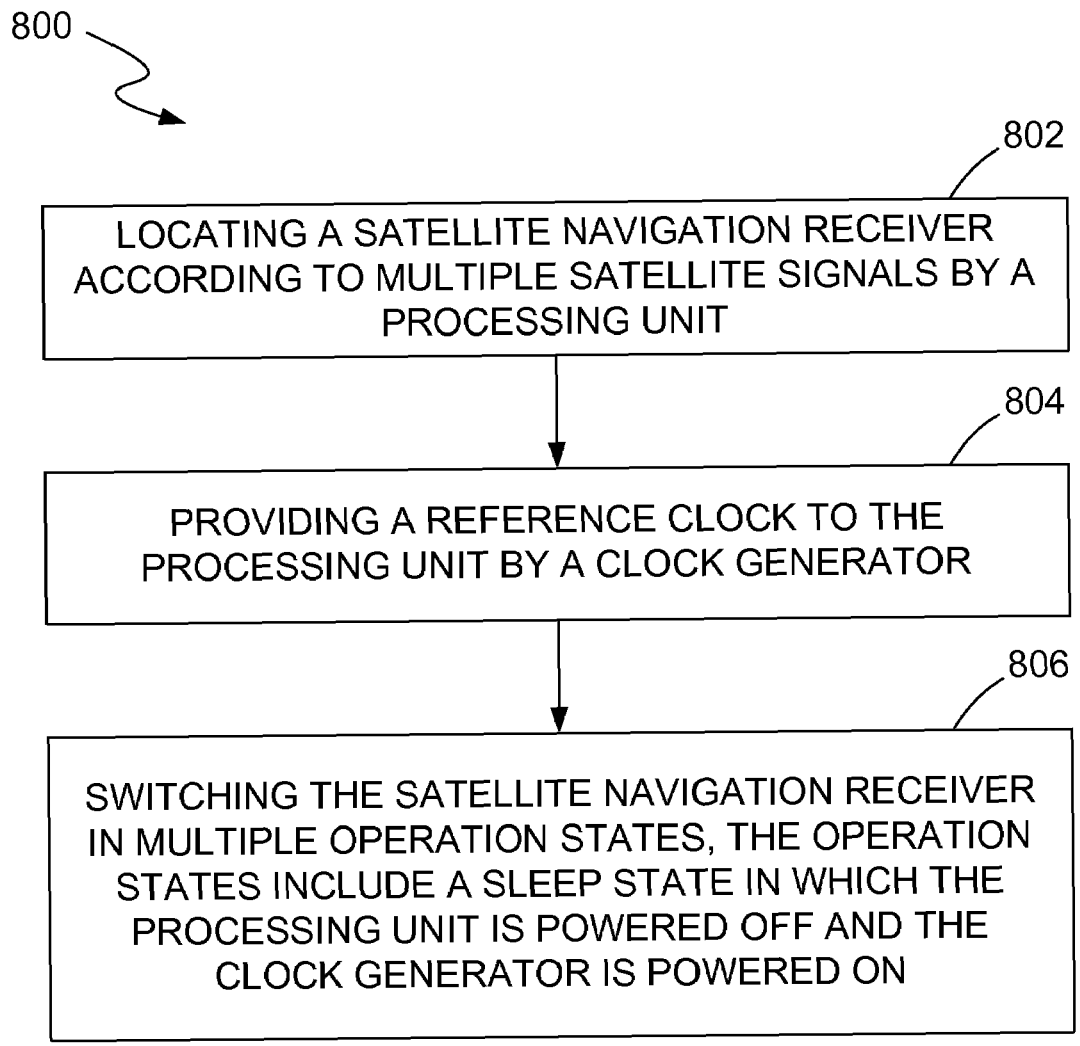
FIG. 8 illustrates a flowchart of operations performed by a satellite navigation device, in accordance with one embodiment of the present invention.

FIG. 8 illustrates a flowchart 800 of operations performed by a satellite navigation device, e.g., the GPS device 100, in accordance with one embodiment of the present invention. FIG. 8 is described in combination with FIG. 1A-FIG. 7. Although specific steps are disclosed in FIG. 8, such steps are examples. That is, the present invention is well suited to performing various other steps or variations of the steps recited in FIG. 8.

In block 802, a satellite navigation receiver, e.g., the GPS receiver 116, is located by a processing unit, e.g., the processing unit 118, according to multiple satellite signals, e.g., the GPS signals 103.

In block 804, a reference clock, e.g., the reference clock 156, is provided to the processing unit by a clock generator, e.g., the clock generator 120.

In block 806, the satellite navigation receiver including the processing unit and the clock generator is switched in multiple operation states. The operation states include a sleep state in which the processing unit is powered off and the clock generator is powered on. In one embodiment, the processing unit includes multiple channels, e.g., the channels 164, operable for acquiring and tracking multiple satellites that generate the satellite signals. The satellite navigation receiver can be switched to an idle state in which all of the channels are disabled when the processing unit is powered on. In one embodiment, the operation states further include a working state in which the processing unit and the clock generator are both powered on. The satellite navigation receiver is enabled to alternately operate in the working state for a predetermined time period T1 and operate in the sleep state for a predetermined time period T2. Alternatively, the satellite navigation receiver is enabled to operate in the working state for a predetermined time period T3 and operate in the sleep state until receiving a signal to activate the processing unit.

Figure 9:
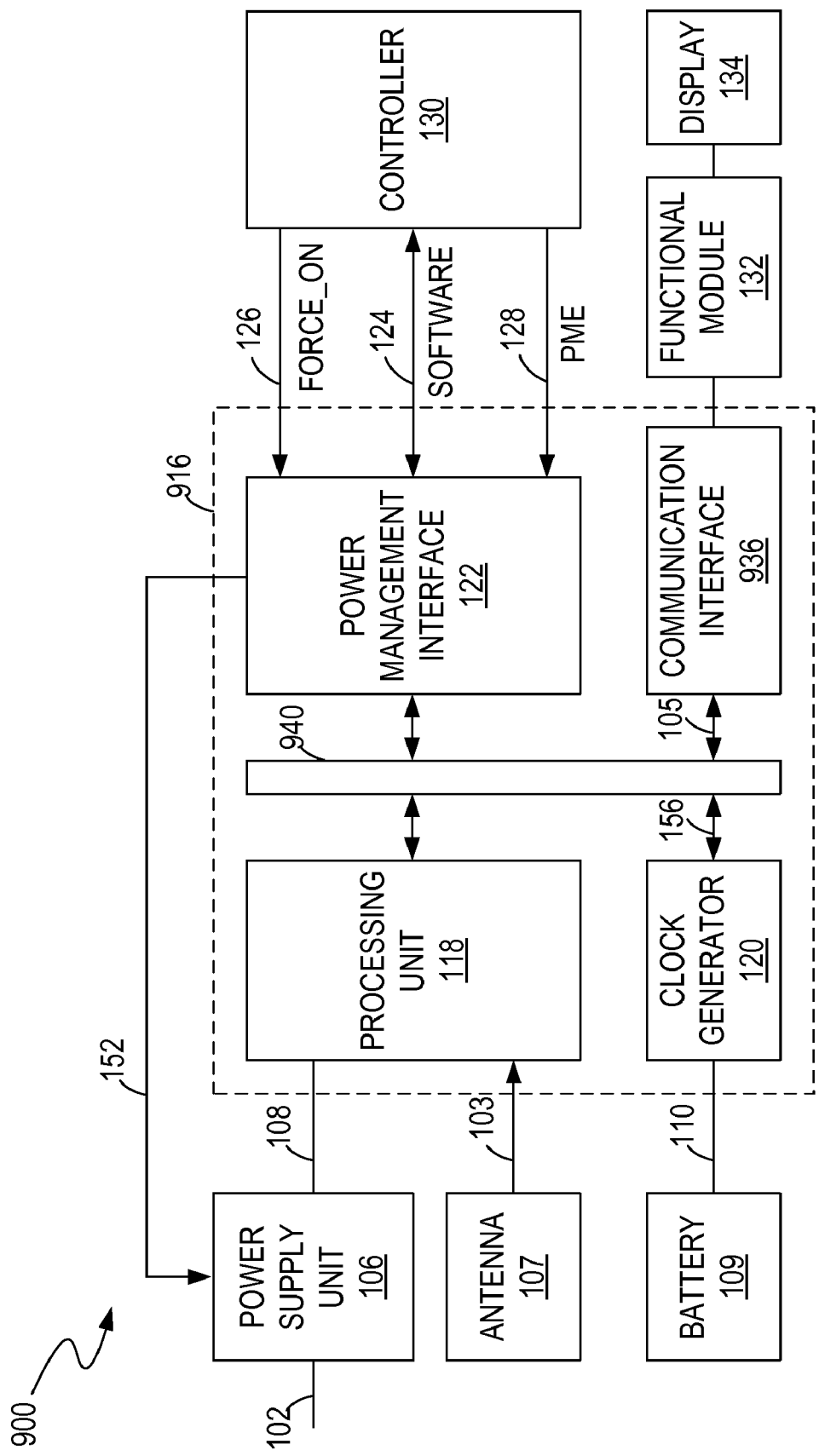
FIG. 9 illustrates another block diagram of a GPS device, in accordance with one embodiment of the present invention.

FIG. 9 illustrates another block diagram of a GPS device 900, in accordance with one embodiment of the present invention. Elements labeled the same as in FIG. 1A have similar functions. FIG. 9 is described in combination with FIG. 1A-FIG. 6.

The GPS device 900 includes an antenna 107, a GPS receiver 916, a functional module 132, a display 134, a power supply 106, a battery 109, and a controller 130. In the example of FIG. 9, the GPS receiver 916 includes a processing unit 118, a clock generator 120, a power management interface 122, a communication interface 936, and a bus 940. The GPS receiver 916 employs the bus 940 to transfer data and information. The bus 940 can include, but is not limited to, a data bus, an address bus, and/or a control bus. In one embodiment, the processing unit 118, the clock generator 120, the power management interface 122, and the communication interface 936 are coupled to each other via the bus 940. The bus 940 is capable of transferring information, e.g., data, instructions, address information, or control commands, in the GPS receiver 916.

Similar to the discussions in relation to FIG. 1A, the processing unit 118 can process the GPS signals 103 and can locate the GPS device 900 accordingly. The processing unit 118 analyzes acquisition and tracking data obtained from the GPS signals 103 to determine location information such as geographical coordinates and a velocity of the GPS device 900. The clock generator 120 can be, but is not limited to, a real-time clock unit or a watchdog timer. The clock generator 120 can provide the reference clock 156. The bus 940 can transfer the reference clock 156 to the processing unit 118. The processing unit 118 can employ the reference clock 156 to measure a traveling time of the GPS signals 103 from a corresponding satellite to the GPS receiver 916.

Figure 10:
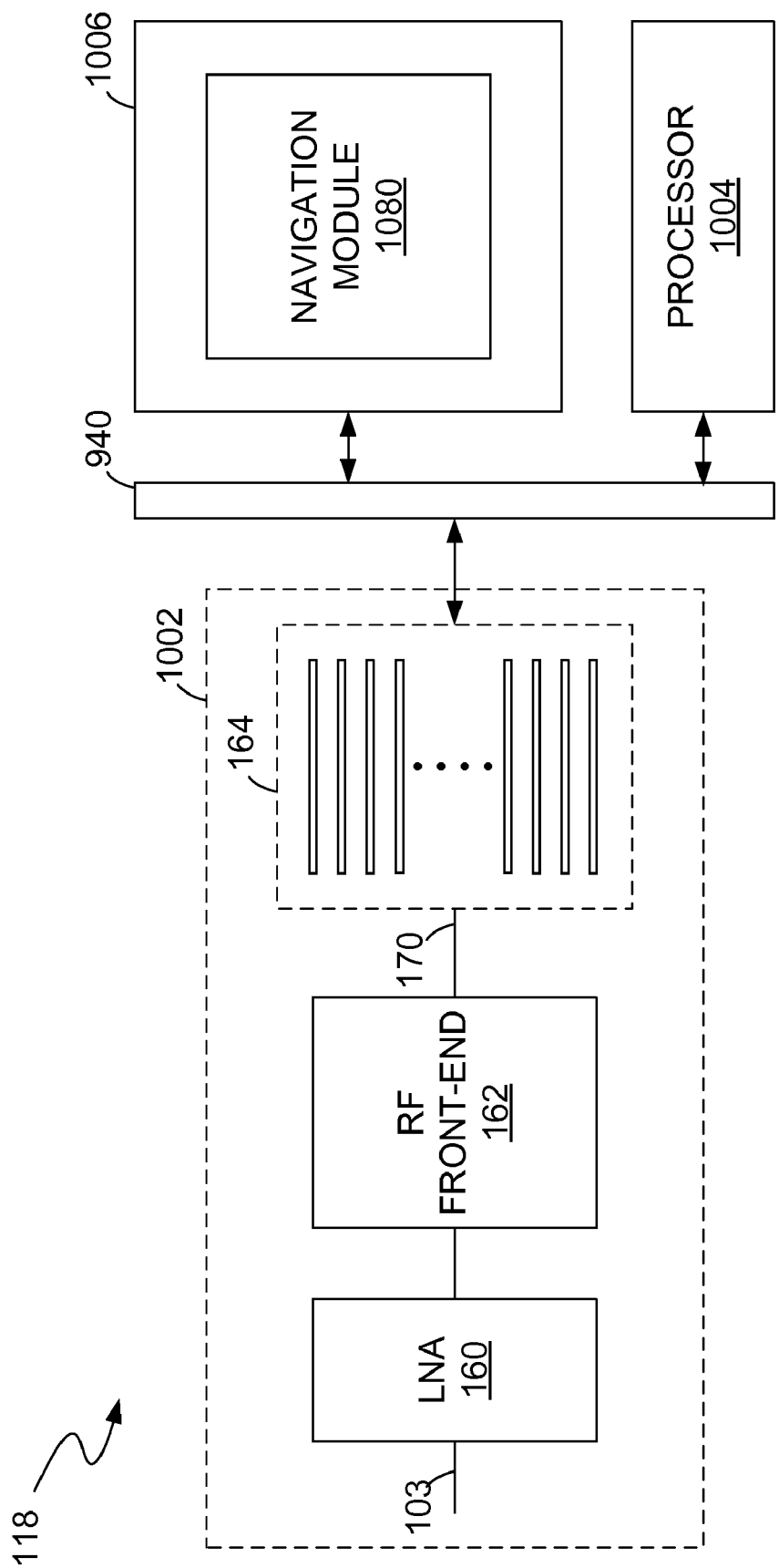
FIG. 10 illustrates an example of a processing unit of FIG. 9, in accordance with one embodiment of the present invention.

FIG. 10 illustrates another example of the processing unit 118 of FIG. 9, in accordance with one embodiment of the present invention. Elements labeled the same as in FIG. 1A, FIG. 1B and FIG. 9 have similar functions. FIG. 10 is described in combination with FIG. 1A, FIG. 1B and FIG. 9.

In one embodiment, the processing unit 118 includes a processor 1004 and a machine-readable medium 1006. The machine-readable medium 1006 can be, but is not limited to, a random access memory (RAM), a read only memory (ROM), an electrically erasable programmable ROM (EEPROM), or a flash memory. The machine-readable medium 1006 can store data and machine-executable programming instructions. The processor 1004 can be a central processing unit (CPU), a microprocessor, a digital signal processor, or any other such device that can read and execute programming instructions. The processor 1004 can execute instructions to generate control commands to control the GPS receiver 916, and can execute instructions to perform arithmetic and logical operations.

In one embodiment, the processing unit 118 can include a tracking module 1002 and a navigation module 1080. In the example of FIG. 10, the navigation module 1080 can be a machine-executable programming module stored in the machine-readable medium 1006. The navigation module 1080 can be executed by the processor 1004. Alternatively, the navigation module 1080 can be another type of module, e.g., a hardware module such as an integrated circuit or an embedded system, within the scope and spirit of the claims.

Components in the processing unit 118, e.g., the tracking module 1002, the processor 1004, and the machine-readable medium 1006, are coupled to each other via the bus 940. Thus, the components in the processing unit 118 can communicate with each other and with other components in the GPS receiver 916 via the bus 940.

The tracking module 1002 is capable of acquiring and tracking the GPS satellites according to the GPS signals 103. In one embodiment, the tracking module 1002 includes a low-noise amplifier (LNA) 160, a radio frequency (RF) front-end 162, and multiple channels 164. The low-noise amplifier 160 and the RF front-end 162 can perform similar functions as described in relation to FIG. 1B.

The channels 164 can receive the GPS satellite data 170 and can acquire and track the GPS satellites by analyzing the GPS satellite data 170. In one embodiment, the multiple channels 164 include acquisition (ACQ) channels and tracking (TRK) channels. The channels 164 can be classified into multiple channel groups. Each channel group can include an acquisition channel and a tracking channel, and can be assigned to process data for a corresponding GPS satellite. More specifically, the acquisition channel can acquire the corresponding satellite according to the GPS satellite data 170. For example, the acquisition channel may be used to analyze the GPS satellite data 170 and determine if the corresponding satellite is within view of (visible to) the GPS receiver 916. If the satellite is acquired by the acquisition channel, a corresponding tracking channel can be used to track the satellite.

The satellite modulates navigation information in a carrier wave, e.g., a sinusoidal wave having a nominal frequency and a nominal phase, before transmitting the GPS signals 103. The frequency and phase of the carrier wave may vary when the GPS signals 103 travel from the satellite to the GPS device 900. For example, due to the Doppler frequency shift, the carrier frequency varies if the velocity of the GPS device 900 relative to a corresponding satellite is changed. To track the satellite, the tracking channel provides a clock signal, e.g., a periodical square wave signal, to extract the navigation information from a corresponding carrier wave. For example, the satellite can be tracked if the clock signal has the same frequency and phase as the carrier wave. If the satellite is tracked, the tracking channel provides the acquisition and tracking data according to the navigation information obtained from the GPS satellite data 170. As such, different GPS satellites may be acquired and tracked by different groups of the acquisition channel and the tracking channel respectively.

Figure 11:
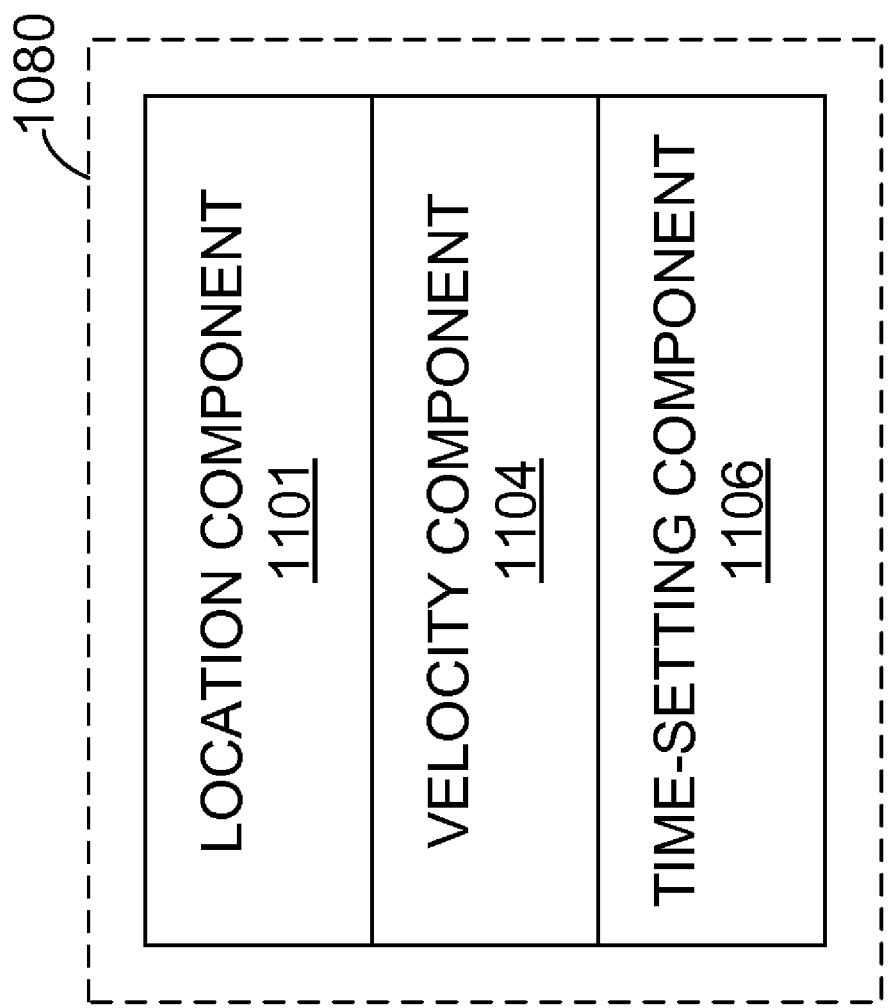
FIG. 11 illustrates an example of a navigation module of FIG. 10, in accordance with one embodiment of the present invention.

In one embodiment, the navigation module 1080 can calculate the geographic coordinates and velocity of the GPS device 900 based on the acquisition and tracking data, which will be detailed described in relation to FIG. 11. In one embodiment, the navigation module 1080 can further generate the coordinate signal 105 indicative of the geographic coordinates of the GPS device 900 according to a result of the calculation. The coordinate signal 105 can be transferred to the communication interface 936 coupled to the functional module 132.

Referring to FIG. 9, the communication interface 936 coupled between the bus 940 and the functional module 132 can be a serial interface, a parallel interface, and/or other types of interfaces, and is capable of sending and receiving electrical, electromagnetic or optical signals that carry digital data streams. For example, the coordinate signal 105 generated by the processing unit 118 can be transferred to the functional module 132 via the bus 940 and the communication interface 936. The functional module 132 can employ the coordinate signal 105 to perform multiple GPS related functions, as described in relation to FIG. 1A.

As described in relation to FIG. 1A-FIG. 6, the GPS device 900 can operate in multiple operation modes such as the continuous positioning mode 204, the interval positioning mode 210, and the required positioning mode 216. The GPS receiver 916 can operate in multiple operation states such as the working state and the sleep state according to the multiple switch control signals generated by the power management interface 122. The switch control signals include the power-switch signal 152, the battery-switch signal 154, and the channel-switch signal 150. The bus 940 can transfer the switch control signals to control the system power 108, the battery power 110, and the channels 164 respectively.

In one embodiment, the power management interface 122 can automatically switch the GPS receiver 916 among different operation states according to predetermined time durations of the operation states, e.g., an operation time for the working state and a sleep time for the sleep state. For example, in the interval positioning mode 210, the power management interface 122 can enable the GPS receiver 916 to alternately operate in the working state for a first predetermined time period T1 according to the operation time and to operate in the sleep state for a second predetermined time period T2 according to the sleep time.

In one embodiment, the navigation software application of the controller 130 can provide a time data set indicative of settings of the time durations of the operation states, e.g., according to user commands. For example, in the interval positioning mode 210, the navigation software application can prompt the user to set the operation time and the sleep time, and configure the setting of the operation time and sleep time in the clock generator 120. As such, the clock generator 120 can time the working state and the sleep state according to the operation time and sleep time. When a time duration for a particular operation state, e.g., the operation time for the working state or the sleep time for the sleep state, is expired, the clock generator 120 can generate a control command. The power management interface 122 receives the control command, and switches the GPS receiver 916 to another operation state accordingly.

Alternatively, the navigation module 1080 of the processing unit 118 can automatically set the time durations of the operation states according to the velocity of the GPS device 900. The position of the GPS device 900 may be changed faster if the velocity of the GPS device 900 is increased. The accuracy of the positioning of the GPS receiver 916 can be enhanced if the processing unit 118 updates the coordinate signal 105 more frequently when the velocity of the GPS device 900 is increased. Advantageously, the navigation module 1080 can automatically adjust the operation time for the working state and the sleep time for the sleep state according to the velocity of the GPS device 900, which will be detailed described in relation to FIG. 11. In this way, the accuracy of the positioning of the GPS receiver 916 can be further improved.

FIG. 11 illustrates an example of the navigation module 1080 of FIG. 10, in accordance with one embodiment of the present invention. Elements labeled the same as in FIG. 10 have similar functions. FIG. 11 is described in combination with FIG. 1A and FIG. 10.

The navigation module 1080 can calculate the geographic coordinates of the GPS device 900. In one embodiment, the navigation module 1080 includes a location component 1101 operable for locating the GPS device 900 based on the acquisition and tracking data. In one embodiment, the location component 1101 includes instruction codes executed by the processor 1004 to calculate the geographical coordinates of the GPS device 900.

More specifically, in one embodiment, the location component 1101 can employ the reference clock 156 to extract a ranging code (e.g., a Coarse/Acquisition code) and navigation data from the acquisition and tracking data. The ranging code includes a pseudorandom noise code (PN or PRN code) that identifies a corresponding satellite. Each satellite has a unique pseudorandom noise code. The location component 1101 can obtain pseudoranges between the tracked GPS satellites and the GPS device 900 from the ranging code. The navigation data can contain GPS date and time, ephemeris data indicating a position of a corresponding satellite, and almanac data indicating information and status regarding all the satellites. The location component 1101 can obtain geographical coordinates of the tracked GPS satellites from the navigation data. As such, based on the obtained pseudoranges and the geographical coordinates associated with at least four GPS satellites, the location component 1101 can calculate the geographical coordinates of the GPS device 900.

The navigation module 1080 can calculate the velocity V_DEVICE of the GPS device 900. In one embodiment, the navigation module 1080 further includes a velocity component 1104 coupled to the location component 1101 and operable for calculating the velocity V_DEVICE of the GPS device 900. In one embodiment, the velocity component 1104 can include instruction codes executed by the processor 1004.

In one embodiment, the velocity component 1104 can calculate the velocity V_DEVICE based on the locating of the GPS device 900, e.g., calculated by the location component 1101. More specifically, the location component 1101 can position the GPS device 900 at a predetermined time interval T_P, such as once per second, in one embodiment. The velocity component 1104 can obtain a travel distance L of the GPS device 900 during the time interval T_P according to geographical coordinates of two positions, e.g., a starting position and a destination position. Accordingly, the velocity component 1104 can calculate the velocity V_DEVICE of the GPS device 900 by dividing the distance L by the time interval T_P.

By way of example, the velocity component 1104 can calculate the velocity V_DEVICE based on the Doppler frequency shift of the satellite signals. As discussed in relation to FIG. 10, the satellite modulates navigation information in the carrier wave, e.g., a sinusoidal wave, having a nominal frequency F_NORMINAL and a nominal phase, before transmitting the GPS signals 103. Due to the Doppler frequency shift, the carrier frequency of the GPS signal 103 varies if the velocity V_R of the GPS device 900 relative to a corresponding satellite is changed. For example, the frequency shift can be approximately proportional to the relative velocity V_R. In one embodiment, the new frequency F_NEW of the carrier can be provided by the tracking channel if the corresponding satellite is tracked. The nominal frequency F_NORMINAL of the carrier and the velocity V_SATELLITE of the corresponding satellite can be obtained from the acquisition and tracking data. As such, based on F_NEW and F_NOMINAL of the carrier wave, the velocity component 1104 can calculate the relative velocity V_R. Furthermore, based on V_R and V_SATELLITE, the velocity component 1104 can calculate the velocity V_DEVICE of the GPS device 900. The velocity component 1104 can calculate the velocity V_DEVICE according to other algorithms.

Moreover, to improve the accuracy of the velocity V_DEVICE, the velocity component 1104 can perform digital signal processing on the calculated velocity V_DEVICE, e.g., by mathematic and/or statistic algorithms. For example, the velocity component 1104 can perform averaging and Kalman filter algorithms to reduce errors, e.g., caused by the noise of the GPS device 900.

The navigation module 1080 can set the time durations of the operation states according to the velocity V_DEVICE of the GPS device 900. In one embodiment, the navigation module 1080 further includes a time-setting component 1106 coupled to the velocity component 1104 and operable for setting the time durations of different operation states based on the velocity V_DEVICE. In one embodiment, the time-setting component 1106 can include instruction codes executed by the processor 1004.

The time-setting component 1106 can include multiple time data sets associated with different velocity conditions, respectively. In one embodiment, each of the time data sets has a value of the operation time and a value of the sleep time associated with a condition of the velocity V_DEVICE. For example, for a first velocity condition (e.g., V_DEVICE is less than a predetermined velocity threshold V_TH), a first time data set has values TW_1 and TS_1 corresponding to the operation time and the sleep time respectively. For a second velocity condition (e.g., V_DEVICE is greater than V_TH), a second time data set has values TW__2 and TS__2 corresponding to the operation time and the sleep time respectively. In this circumstance, TW__1 can be less than TW__2, and TS__1 can be greater than TW__2. There can be other time data sets including operation time and sleep time under other different velocity conditions.

In one embodiment, the time data sets can be predetermined or programmed by the navigation software application of the controller 130 according to a user command. For example, the navigation software application can prompt the user to set different values of the operation time and the sleep time under different velocity conditions, and can store the time data sets to the navigation module 1080. In another embodiment, the time data sets can have default values, e.g., set by manufactures of the GPS device 900.

The time-setting component 1106 is operable for setting time durations of different operation states, respectively, based on the velocity V_DEVICE. More specifically, the time-setting component 1106 determines a condition of the velocity V_DEVICE and selects a corresponding time data set to set the time durations accordingly. In one embodiment, the time-setting component 1106 defines one or more velocity thresholds, and compares the velocity V_DEVICE to the velocity thresholds to determine the condition of the velocity V_DEVICE.

For example, the velocity thresholds can include a velocity threshold V_TH. In a first condition, e.g., V_DEVICE is less than V_TH, the first time data set having values TW__1 and TS__1 is selected to set the operation time and the sleep time. In a second condition, e.g., V_DEVICE is greater than V_TH, the second time data set having values TW__2 and TS__2 is selected to set the operation time and the sleep time. In this circumstance, TW__2 is greater than TW__1, and TS__2 is less than TS__1. In another word, the processing unit 118 can work longer and sleep shorter to update the coordinate signal 105 more frequently if the GPS device 900 moves faster, which can further improve the accuracy of positioning of the GPS receiver 916.

In another embodiment, the time-setting component 1106 can calculate an average velocity V_AVERAGE of the GPS device 900 during a predetermined time period and can select a corresponding time data set according to a condition of the average velocity V_AVERAGE. For example, the time-setting component 1106 can sample the calculated velocity V_DEVICE for a predetermined number of times during a predetermined time interval, e.g., three times per 5 seconds. Thus, the average velocity V_AVERAGE can be an average value of the predetermined number of the sampled velocity values. In another example, the time-setting component 1106 samples the calculated velocity V_DEVICE, and calculates the average velocity of the current sampled velocity and the last sampled velocity. By employing the average velocity V_AVERAGE instead of the instantaneous velocity V_DEVICE, errors of setting the time durations, e.g., caused by a relatively sudden change of the velocity V_DEVICE, can be avoided or reduced. For example, the time-setting component 1106 would not reset the time durations if the velocity V_DEVICE varies and then recovers in a relatively short time period.

The selected time data set can be programmed into the clock generator 120 to time the time durations of the operation states, e.g., T1 for the working state and T2 for the sleep state. In operation, the GPS receiver 916 can first enter the working state, in one embodiment. If the operation time expires, e.g., after the GPS receiver 916 operates in the working state for the first predetermined time period T1, the power management interface 122 can automatically switch the GPS receiver 916 to the sleep state. If the sleep time expires, e.g., after the GPS receiver 916 operates in the sleep state for the second predetermined time period T2, the power management interface 122 can automatically switch the GPS receiver 916 to the working state.

Advantageously, the power consumption of the GPS receiver 916 can be reduced if the GPS receiver 916 operates in the sleep state. Moreover, the navigation module 1080 can adjust the time durations of different operation states, e.g., the working state and the sleep state, according to the velocity of the GPS device 900. For example, the processing unit 118 updates the coordinate signal 105 more frequently if the GPS device 900 moves faster. As such, the accuracy of the positioning of the GPS device 900 can be further improved.

Figure 12:
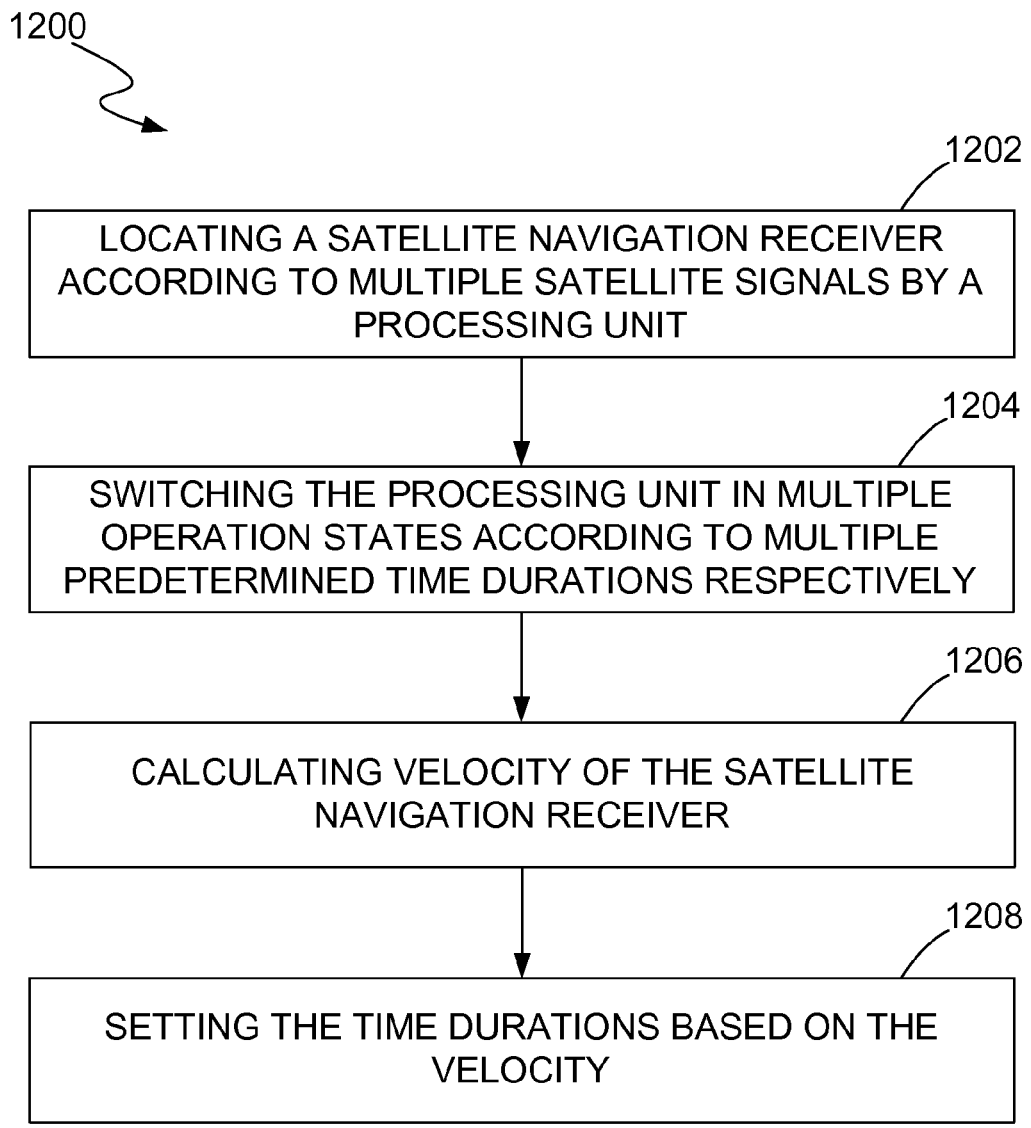
FIG. 12 illustrates another flowchart of operations performed by a satellite navigation device, in accordance with one embodiment of the present invention.

FIG. 12 illustrates a flowchart 1200 of operations performed by a satellite navigation device, e.g., the GPS device 900, in accordance with one embodiment of the present invention. FIG. 12 is described in combination with FIG. 1A-FIG. 11. Although specific steps are disclosed in FIG. 12, such steps are examples. That is, the present invention is well suited to performing various other steps or variations of the steps recited in FIG. 12. In one embodiment, the flowchart 1200 can be implemented as machine-executable instructions stored in a machine-readable medium.

In block 1202, a satellite navigation receiver, e.g., the GPS receiver 916, is located by a processing unit, e.g., the processing unit 118, according to multiple satellite signals, e.g., the GPS signals 103.

In block 1204, the processing unit is switched in multiple operation states according to multiple predetermined time durations for the operation states respectively. In one embodiment, the processing unit 118 is alternately switched between a working state in which the processing unit 118 is powered on and a sleep state in which the processing unit 118 is powered off.

In block 1206, a velocity of the satellite navigation receiver, e.g., the velocity V_DEVICE, is calculated. In one embodiment, the velocity V_DEVICE is calculated according to the locating of the satellite navigation receiver. Alternatively, the velocity V_DEVICE is calculated according to Doppler frequency shift of the satellite signals. In one embodiment, digital signal processing is performed on the calculated velocity.

In block 1208, the time durations are set according to the velocity of the satellite navigation receiver. In one embodiment, the time-setting component 1106 has multiple time data sets associated with multiple velocity conditions respectively. The time-setting component 1106 can select a corresponding time data set from the multiple time data sets according to a condition of the velocity, and can set the time durations of the operation states according to the selected time data set. In one embodiment, the time-setting component 1106 defines one or more velocity thresholds, e.g., the threshold V_TH, and determines the condition of the velocity by comparing the velocity to the velocity threshold.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A satellite navigation receiver operating in a plurality of operation states, the satellite navigation receiver comprising:
   a processing unit configured to:
      locate the satellite navigation receiver based on a plurality of satellite signals,
      sample a velocity of the satellite navigation receiver for a predetermined number of times during a predetermined time period to provide a plurality of sampled velocity values,
      calculate an average velocity of the satellite navigation receiver based on the sampled velocity values, and
      set a plurality of time durations of the plurality of operation states, respectively, based on the average velocity of the satellite navigation receiver; and
   a power management interface operatively coupled to the processing unit and configured to switch the satellite navigation receiver among the plurality of operation states according to the plurality of time durations.

2. The satellite navigation receiver as claimed in claim 1, wherein the plurality of operation states comprise:
   a working state in which the processing unit is powered on, and
   a sleep state in which said the processing unit is powered off.

3. The satellite navigation receiver as claimed in claim 1, wherein the processing unit comprises a velocity component configured to calculate the said velocity of the satellite navigation receiver based on locating the satellite navigation receiver.

4. The satellite navigation receiver as claimed in claim 1, wherein the processing unit comprises a velocity component configured to calculate the velocity of the satellite navigation receiver according to a Doppler frequency shift of the plurality of satellite signals.

5. The satellite navigation receiver as claimed in claim 1, wherein the processing unit comprises a velocity component configured to calculate the velocity of the satellite navigation receiver and perform digital signal processing on the calculated velocity.

6. The satellite navigation receiver as claimed in claim 1, wherein the processing unit is configured to store a plurality of time data sets associated with a plurality of corresponding velocity conditions, and wherein the processing unit is configured to select a corresponding time data set according to a condition of the velocity and set the time durations according to the corresponding time data set.

7. The satellite navigation receiver as claimed in claim 6, wherein the processing unit is further configured to define a velocity threshold, and compare the average velocity to the velocity threshold to determine the condition of the velocity.

8. The satellite navigation receiver as claimed in claim 6, wherein the time data sets are predetermined and stored in the satellite navigation receiver.

9. A method for controlling a satellite navigation receiver, the method comprising:
   locating the satellite navigation receiver according to a plurality of satellite signals;
   sampling a velocity of the satellite navigation receiver for a predetermined number of times during a predetermined time period to provide a plurality of sampled velocity values;
   calculating an average velocity of the satellite navigation receiver based on the sampled velocity values;
   switching the satellite navigation receiver between a plurality of operation states according to a plurality of predetermined time durations of the plurality of operation states, respectively; and
   setting the plurality of predetermined time durations based on the average velocity of the satellite navigation receiver.

10. The method as claimed in claim 9, wherein the switching step comprises:
    alternately switching the satellite navigation receiver between a working state in which a processing unit is powered on and a sleep state in which the processing unit is powered off.

11. The method as claimed in claim 9, further comprising:
    calculating the velocity of the satellite navigation receiver based on locating the satellite navigation receiver.

12. The method as claimed in claim 9, further comprising:
    calculating the velocity of the satellite navigation receiver according to a Doppler frequency shift of the plurality of satellite signals.

13. The method as claimed in claim 9, further comprising:
    calculating the velocity of the satellite navigation receiver; and
    performing digital signal processing on the calculated velocity.

14. The method as claimed in claim 9, wherein the setting step comprises:
    accessing a plurality of time data sets associated with a corresponding plurality of velocity conditions;
    selecting a corresponding time data set from the plurality of time data sets according to a corresponding velocity condition; and
    setting the predetermined time durations according to the selected time data set.

15. The method as claimed in claim 14, further comprising:
    defining a velocity threshold; and
    determining the condition of said velocity by comparing the average velocity to the velocity threshold.

16. A satellite navigation device comprising:
    a satellite navigation receiver configured to operate in a plurality of operation states, the satellite navigation receiver comprising:
       a tracking module configured to provide acquiring and tracking data of a plurality of satellites according to a plurality of satellite signals;
       a non-transitory machine-readable medium operatively coupled to said tracking module, that stores a plurality of instruction codes executable by a processor to:
          provide a coordinate signal based on the acquiring and tracking data,
          sample a velocity of the satellite navigation receiver a redetermined number of times during a predetermined time period to provide a plurality of sampled velocity values,
          calculate an average velocity of the satellite navigation receiver based on the sampled velocity values, and
          set a plurality of time durations of the plurality of operation states, respectively, based on the average velocity of the satellite navigation device; and a display, operatively coupled to the satellite navigation receiver, and configured to display a location of the satellite navigation device according to the coordinate signal.

17. The satellite navigation device as claimed in claim 16, wherein the non-transitory machine-readable medium stores the plurality of instruction codes executable by the processor to calculate the velocity of the satellite navigation receiver according to the coordinate signal.

18. The satellite navigation device as claimed in claim 16, wherein said the non-transitory machine-readable medium stores the plurality of instruction codes executable by the processor to calculate the velocity of the satellite navigation receiver according to a Doppler frequency shift of the plurality of satellite signals.

19. The satellite navigation device as claimed in claim 16, wherein said non-transitory machine-readable medium further stores a plurality of predetermined time data sets associated with a plurality of velocity conditions, respectively, and wherein the plurality of instruction codes is executable by the processor to select a corresponding time data set according to a condition of the velocity and set the time durations according to the selected time data set.

20. The satellite navigation device as claimed in claim 19, wherein the non-transitory machine-readable medium further stores a velocity threshold, and wherein the plurality of instruction codes is further executable by the processor to determine the condition of the velocity by comparing the average velocity to the velocity threshold.

21. The satellite navigation device as claimed in claim 19, wherein the time data sets are predetermined and stored in the satellite navigation device.

* * * * *